United States Patent
Lunawat (10) Patent No.: US 7,765,519 B2
(45) Date of Patent: Jul. 27, 2010

(54) EFFICIENT BUILDS FOR INSTALLATION SOFTWARE

(75) Inventor: Ajay Lunawat, San Jose, CA (US)

(73) Assignee: International Business Machines Corporation, Armonk, NJ (US)

( * ) Notice: Subject to any disclaimer, the term of this patent is extended or adjusted under 35 U.S.C. 154(b) by 1196 days.

(21) Appl. No.: 11/305,575

(22) Filed: Dec. 16, 2005

(65) Prior Publication Data

US 2007/0168940 A1    Jul. 19, 2007

(51) Int. Cl.
    *G06F 9/44* (2006.01)
(52) U.S. Cl. .................................. 717/100; 717/101
(58) Field of Classification Search ......... 717/100–101, 717/174–175
    See application file for complete search history.

(56) References Cited

U.S. PATENT DOCUMENTS

| | | | | |
|---|---|---|---|---|
| 5,933,144 | A * | 8/1999 | Alcorn ....................... | 715/809 |
| 6,237,135 | B1 * | 5/2001 | Timbol ....................... | 717/107 |
| 6,289,512 | B1 * | 9/2001 | Edwards et al. ............. | 717/178 |
| 6,473,766 | B1 | 10/2002 | Leiserson et al. | |
| 6,684,387 | B1 * | 1/2004 | Acker et al. ................. | 717/126 |
| 6,754,659 | B2 * | 6/2004 | Sarkar et al. .................... | 707/10 |
| 7,506,327 | B2 * | 3/2009 | Kovacs et al. ............... | 717/144 |
| 2002/0108099 | A1 * | 8/2002 | Paclat .......................... | 717/102 |
| 2003/0037320 | A1 * | 2/2003 | Lovvik et al. ............... | 717/148 |
| 2003/0084056 | A1 * | 5/2003 | DeAnna et al. ............. | 707/100 |
| 2003/0221189 | A1 * | 11/2003 | Birum et al. ................. | 717/170 |
| 2003/0221190 | A1 * | 11/2003 | Deshpande et al. ......... | 717/171 |
| 2004/0049481 | A1 * | 3/2004 | Blevins ......................... | 707/1 |
| 2004/0158585 | A1 * | 8/2004 | Kovacs et al. ............. | 707/104.1 |
| 2005/0125788 | A1 * | 6/2005 | Lupini et al. ................. | 717/174 |
| 2005/0210462 | A1 * | 9/2005 | Chupa et al. ................. | 717/171 |
| 2005/0273779 | A1 * | 12/2005 | Cheng et al. ................. | 717/168 |
| 2006/0053410 | A1 * | 3/2006 | Charisius et al. ............ | 717/109 |
| 2006/0123414 | A1 * | 6/2006 | Fors et al. .................... | 717/177 |
| 2009/0077105 | A1 * | 3/2009 | DeAnna et al. ............. | 707/100 |
| 2009/0077175 | A1 * | 3/2009 | DeAnna et al. ............. | 709/203 |
| 2009/0100166 | A1 * | 4/2009 | DeAnna et al. ............. | 709/223 |
| 2009/0150881 | A1 * | 6/2009 | Lupini et al. ................. | 717/174 |

* cited by examiner

*Primary Examiner*—Anna Deng
(74) *Attorney, Agent, or Firm*—Canady & Lortz LLP; Bradley K. Lortz (57) ABSTRACT

Software and methods for building a multiplatform installation program are disclosed. Embodiments of the invention create a novel class as a proxy for the Archive builder support method and call the methods in this new class for the build methods of custom beans instead those of the archive builder support. This proxy archive builder support method keeps a list of classes which have already been added for a given build. If the class is already been added, it is ignore on subsequent calls. If the class has not been added, it is passed to the archive builder support method to process and add it to the archive. In addition, Java provides APIs to inspect a class and find its dependencies programmatically. When the archive builder support method is called on a class, the class is also inspected for its dependencies. Any dependent classes are added as well using archive builder support method. This process is also performed recursively so dependencies of dependencies (and so on) are added as well.

12 Claims, 6 Drawing Sheets

EFFICIENT BUILDS FOR INSTALLATION SOFTWARE

BACKGROUND OF THE INVENTION

1. Field of the Invention

This invention relates to computer programs. Particularly, this invention relates to computer programs for building installation software, such as cross platform installation software.

2. Description of the Related Art

InstallShield Multi-Platform (ISMP) is a software tool that allows application developers to package their products for installation on multiple platforms. The software provides a graphical build environment that allows application developers to create an installation for their products for multiple different operating system platforms, e.g. AIX, WINDOWS, LINUX, SOLARIS, OS/400, HP-UX, and MacOS Support for any one of these operating system platforms can be readily enabled by selecting a checkbox in the graphical builder.

As is known in the art, Java Beans is a portable, platform-independent software component model written in Java. They allow developers to write reusable components once and run them on any operating system platform. The beans themselves are Java classes that can be manipulated in a visual builder tool and composed together into various applications. Any Java class that adheres to certain property and event interface conventions can be a bean.

ISMP provides a facility to create custom beans to extend the functionality for user specific requirements. These custom beans are written in Java and used to extend ISMP provided bean classes. To be available to the installer at run time, all the custom beans classes and the classes that these beans depend upon, must be added to the install packages, e.g. in a Java archive (JAR) file. To facilitate adding the classes to an archive with ISMP, the custom beans typically override the regular build method and invoke the archive builder support for the custom beans to be added in an ISMP project (e.g. the archive builder support method).

Unfortunately, ISMP builds involving such custom beans are slow. For example, more then one bean may the use same classes. However, all these beans need to add these same classes to the archive. In addition, one project may have more then one instance of the bean. For each of these, the archive builder support method is called. This call requires excessive processing which includes verifying the class file existence and accessibility at the build time. In addition, the call includes calculating the class file size. Repeating this processing for duplicated classes unnecessarily adds to build time because the details of a given class file does not change during a build.

Another drawback of ISMP build involving customs beans is that the custom bean class or the classes used by beans may have inner classes. In additon, they may extend other classes or implement interfaces and/or use other classes for field, method and constructor arguments, exceptions and/or return types. These are dependent classes which need to be available to instantiate and use the original class. This implicitly means that writing of the custom bean requires additional calls of the archive builder support put class method for these dependent classes. That it turn requires the custom bean writer to be aware of implementation details of the classes being used in the custom bean.

As the dependent classes of a custom bean class may have similar dependencies (and recursively so on) of their own, the custom bean writer needs to be aware of the implementation detail of the entire class hierarchy. Furthermore, because it may be difficult or impossible for the custom bean writer to know details of the implementation of third party code, there is a risk of not having some of these dependent classes available during the execution of the install. Consequently, some necessary classes may be overlooked and the execution of the install may failing unexpectedly.

The conventional technique for dealing with the difficulties described above is for the custom bean writer to explore all the classes and get familiar with the class hierarchy (which may even require reverse engineering the code) and then add the Archive builder support method calls to include all the required dependent classes. However, this is a tedious process as the bean writer must manually analyze the class structure and include the necessary classes. Another conventional technique involves adding all the the third party supplied JAR files which comprise all the dependent classes. This approach has an big drawback of making the install distribution package excessively large, as the JAR files may include many more classes than are required by the custom beans.

Some other developments involving software installation utilizing Java have also occurred. Some examples are described hereafter.

U.S. Patent Application 20,020,108,099, published Aug. 8, 2002, discloses a process for developing an Enterprise Java-Bean (EJB) component by analyzing a business domain to generate functional requirements that models the business domain. The functional requirements are transformed into an EJB component model, preferably using a UML drawing tool. The resulting EJB component is then built from the EJB component model that encompass the business functionality of the business domain. The process enables the user/developer to research business problems or domain (i.e., business project) and transforms them into EJB components.

U.S. Patent Application 20,050,125,788, published Jun. 9, 2005, discloses a method of installing software applications using a wizard-based installation package (for example, built using "InstallShield"). The installation package is defined declaring a discoverer bean, a producer bean, a consumer bean and a debugger bean into the wizard tree (while the product tree is left empty). During the installation process, the discoverer creates a working queue dynamically, inserting the installation operations that are needed for reaching a desired configuration (defined in a descriptor of the software application) from a current configuration (detected at run-time). The consumer executes the installation operations defined in the working queue in succession. Whenever an error condition is detected, the installation process is suspended and the debugger is invoked. An administrator can browse an execution log of each installation operation and update any wrong operative parameter. The installation process is then resumed without having to repeat the installation operations already executed.

U.S. Pat. No. 6,473,766, issued Oct. 29, 2002, discloses a product action bean for updating lines and keywords in computer system configuration flat text or ASCII files, which is especially useful for during installation of software applications on computer systems. In its embodiment as a Java bean, it is customized and configured using a visual application builder across multiple computing platforms. The primary bean is a container bean, which includes an engine, and which provides a graphical user interface ("GUI") that developers can easily specify the required changes along with the file name to be changed when an application is installed or uninstalled. The container bean also contains a set of action beans which perform operations to modify the ASCII file, such as finding strings or lines, adding strings or lines, and deleting strings or lines. The specified actions are performed as a "unit of work" in the customized bean. Alternate classes of objects for modifying text files may be included in the container bean to expand the action options available to the developer.

In view of the foregoing, there is a need in the art for systems and methods to perform more efficient and more reliable builds for installation software, particularly a multi-platform software installation. In addition, there is a need for such systems and methods when custom beans are employed in a Java implementation. There is still further a need for such systems and methods to function automatically, minimizing the need for a programmer to manually analyze the build structure. As detailed hereafter, these and other needs are met by the present invention.

SUMMARY OF THE INVENTION

The present invention may be applied to systems and methods for building an installation for a software application. Embodiments of the invention employ a new class as a proxy for the archive builder support method and call the method for this new class from the build methods of custom beans instead of those of the standard archive builder support. This proxy archive builder support method keeps a list of classes which have already been added for a given build. If the class is already been added, it is ignored on subsequent calls. If the class has not been added, it is passed to the standard archive builder support method to process and add it to the archive. Thus, the proxy archive builder support method provides a performance improvement by enhancing the build efficiency because the standard archive builder support method is called only once for a given class even when multiple custom beans may be using it or despite multiple instances of custom beans in the project.

In addition, Java provides APIs to inspect a class and find its dependencies programmatically. When the standard archive builder support method is called on a class, the class is also inspected for its dependencies. Any dependent classes are added as well using archive builder support method. This process may also be performed recursively so dependencies of dependencies (and so on) are added as well. This relieves the custom bean developers off burden of figuring out the detailed dependencies of classes they use in the custom beans. This also reduces the chances on not having one or more of the classes available at install run time. Moreover, unnecessary classes are not added to the install archive buy adding whole jar files, reducing the size.

A typical embodiment of the invention comprises a computer program embodied on a computer readable medium including program instructions for keeping a class list of one or more previously added classes that have already been added to a software build, program instructions for checking the class list of the one or more previously added classes for a class of an added bean, and program instructions for adding the class not found from checking the class list to the class list. Further embodiments of the invention may include program instructions for adding the class of the added bean not found from checking the class list to the software build. Adding the class of the added bean to the software build may be performed by passing the class of the added bean not found from checking the class list to a standard archive builder support method and keeping, checking, and adding to the class list may be performed by a proxy archive builder support method.

In addition, further embodiments of the invention may include program instructions for inspecting the class of the added bean for one or more dependent classes of the class and adding any of the one or more dependent classes found to the class list. Program instructions may be included for adding any of the one or more dependent classes found to the software build. Inspecting the class of the added bean for the one or more dependent classes of the class may be performed recursively (to identify further dependencies). Furthermore, inspecting the class of the added bean for the one or more dependent classes of the class may be performed using a standard application program interface.

In some embodiments of the invention, the added bean comprises a custom bean and the class comprises a custom class of the custom bean. Likewise, the one or more previously added classes may comprise one or more previously added custom bean classes. The software build may comprise a multiplatform installation software build for some exemplary embodiments of the invention.

Similarly, a typical method embodiment may comprise keeping a class list of one or more previously added classes that have already been added to a software build, checking the class list of the one or more previously added classes for a class of an added bean, and adding the class not found from checking the class list to the class list. Method embodiments of the invention may be further modified, consistent with the computer program embodiment on a computer readable medium.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the present invention may be applied to systems and methods for building a multiplatform installation for a software application, such as the InstallShield Multi-Platform (ISMP). Embodiments of the invention employ a new class as a proxy for the archive builder support method and calling the method of this new class, instead that of the standard archive builder support, from the build method of custom beans. This proxy class for archive builder support keeps a list of classes which have already been added for a given build. If the class is already been added, it is ignored on subsequent calls. If the class has not been added, it is passed to the standard archive builder support method to process and add it to the archive. In addition, when the standard archive builder support method is called on a class, the class is also inspected for its dependent classes. Any new dependent classes are added as well using archive builder support method. This process is also performed recursively so dependencies of dependencies (and so on) are added as well. Other modifications and exemplary embodiments of the invention shall be detailed hereafter.

2. Hardware Environment

Figure 1:
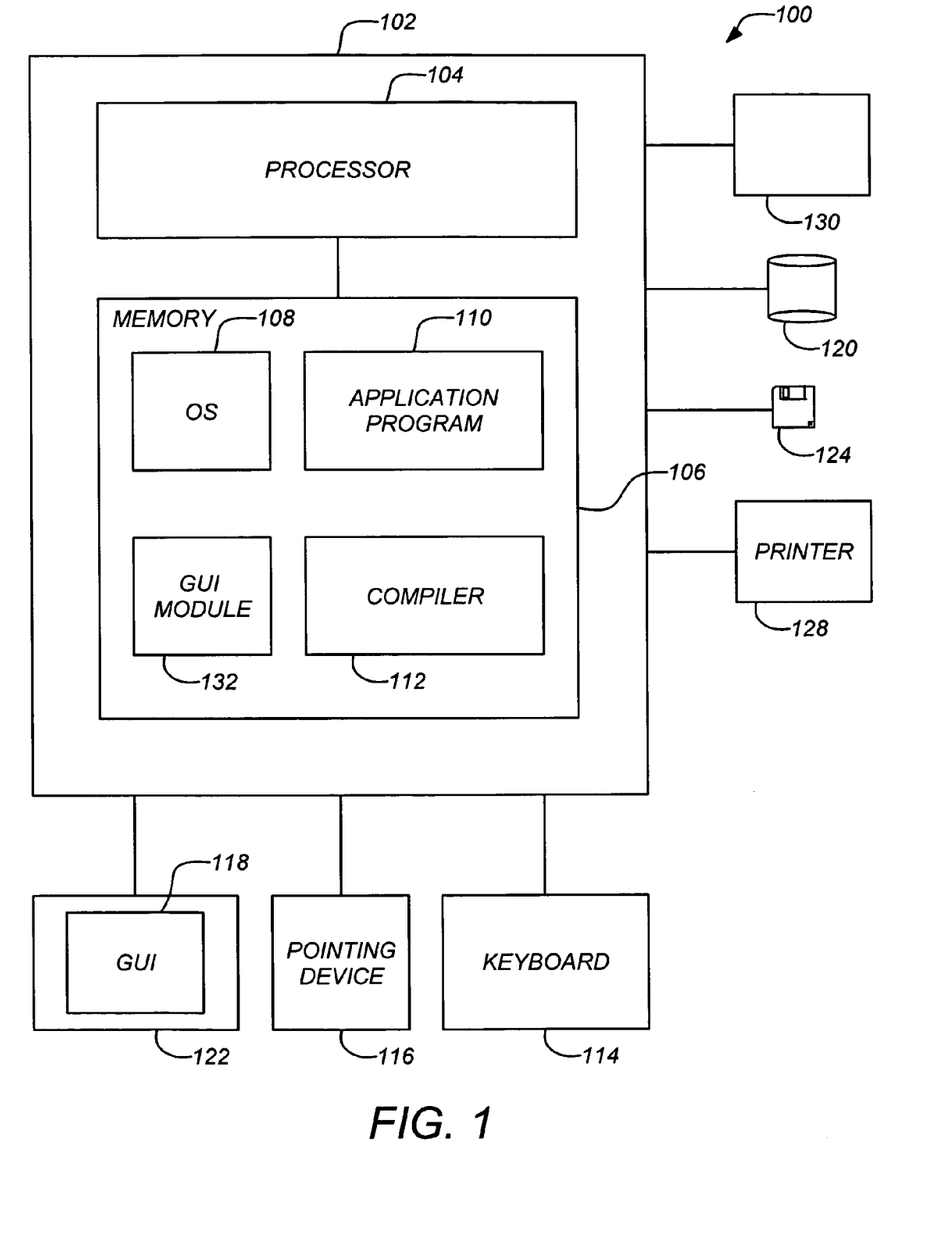
FIG. 1 illustrates an exemplary computer system that can be used to implement embodiments of the present invention.

FIG. 1 illustrates an exemplary computer system 100 that can be used to implement embodiments of the present invention. The computer 102 comprises a processor 104 and a memory 106, such as random access memory (RAM). The computer 102 is operatively coupled to a display 122, which presents images such as windows to the user on a graphical user interface 118. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 (e.g. z/OS, OS/400, LINUX, UNIX, WINDOWS, MAC OS) stored in the memory 106, and interfaces with the user to accept inputs and commands and to present results, for example through a graphical user interface (GUI) module 132. Although the GUI module 132 is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, PL/1, C, C++, Java, ADA, BASIC, VISUAL BASIC or any other programming language to be translated into code that is readable by the processor 104. After completion, the computer program 110 accesses and manipulates data stored in the memory 106 of the computer 102 using the relationships and logic that was generated using the compiler 112. The computer 102 also optionally comprises an external data communication device 130 such as a modem, satellite link, ethernet card, wireless link or other device for communicating with other computers, e.g. via the Internet or other network.

In one embodiment, instructions implementing the operating system 108, the computer program 110, and the compiler 112 are tangibly embodied in a computer-readable medium, e.g., data storage device 120, which may include one or more fixed or removable data storage devices, such as a zip drive, floppy disc 124, hard drive, DVD/CD-rom, digital tape, etc., which are generically represented as the floppy disc 124. Further, the operating system 108 and the computer program 110 comprise instructions which, when read and executed by the computer 102, cause the computer 102 to perform the steps necessary to implement and/or use the present invention. Computer program 110 and/or operating system 108 instructions may also be tangibly embodied in the memory 106 and/or transmitted through or accessed by the data communication device 130. As such, the terms "article of manufacture," "program storage device" and "computer program product" as may be used herein are intended to encompass a computer program accessible and/or operable from any computer readable device or media.

Embodiments of the present invention are generally directed to any software application program 110 that includes functions for developing an installation program for computer software, such as the InstallShield Multi-Platform (ISMP). Although embodiments of the invention are described with respect to the ISMP software, the invention is not limited to such application as shall be understood by those skilled in the art. Similarly, the software application program 110 may utilize Java employing beans which is well suited to facilitate the multiplatform support as is known in the art, although embodiments of the invention encompass implementations using other analogous programming languages and operating systems.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Installation Build and Java Beans

Figure 2A:
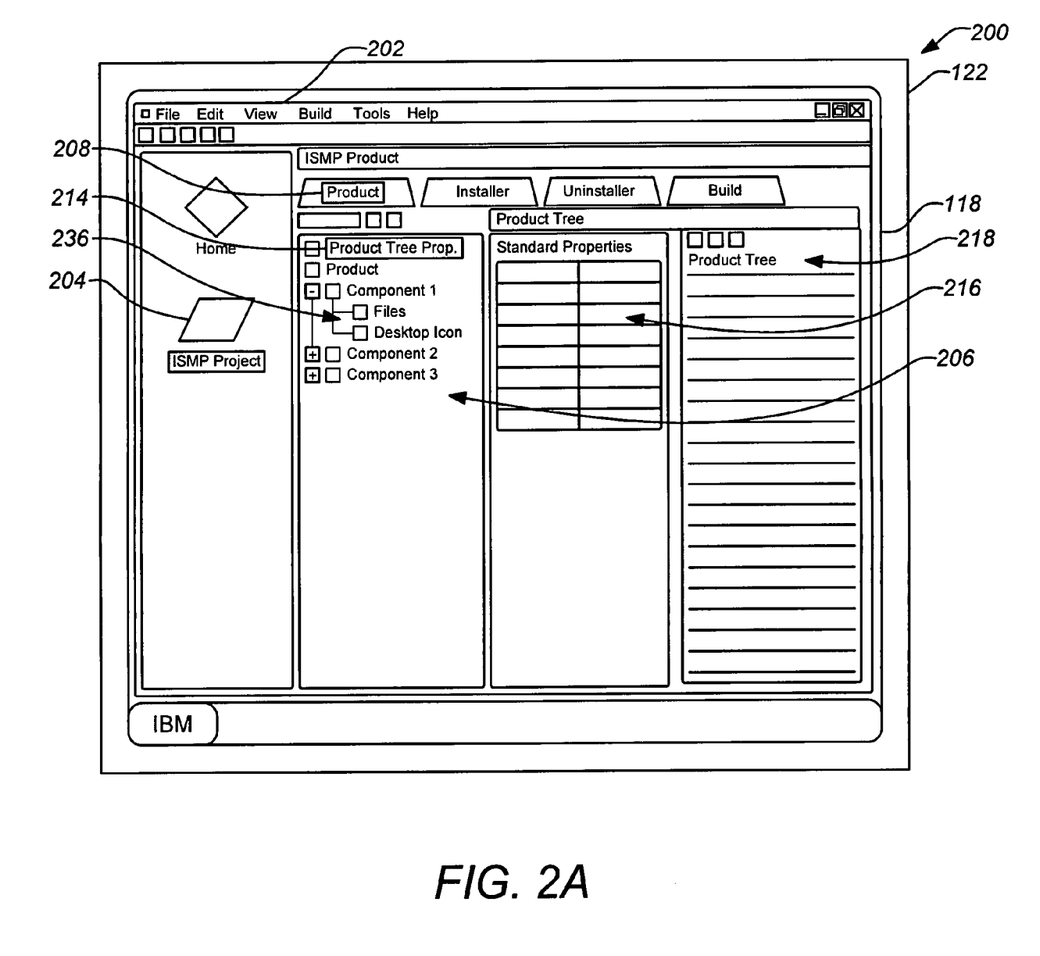
FIG. 2A illustrates an example product tree on a product tab of the interface for an example installation software build.
Figure 2B:
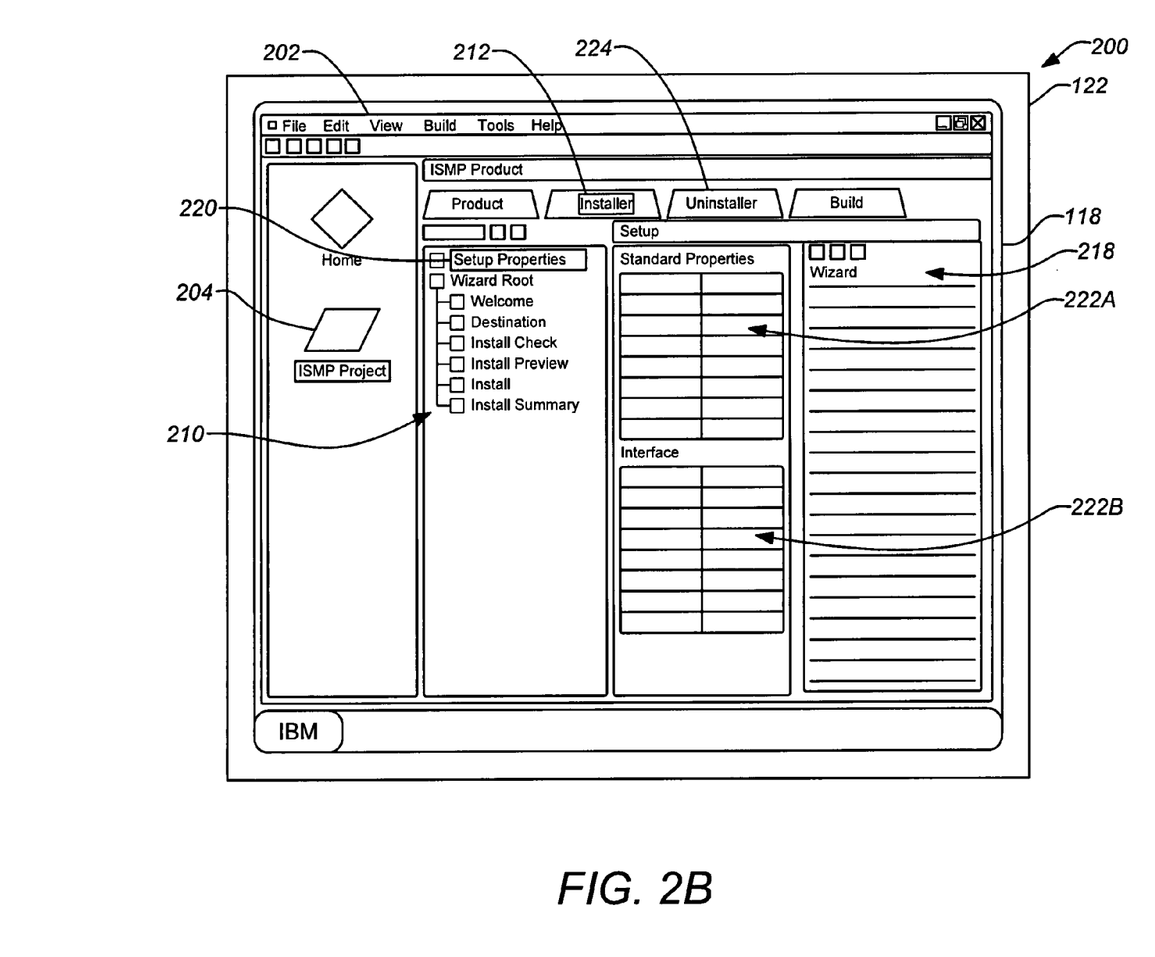
FIG. 2B illustrates an example wizard tree on the install tab for an example installation software build.

FIGS. 2A and 2B illustrates an example product tree 206 on a product tab 208 of the interface and the wizard tree 210 on the install tab 212 for an example installation software build, e.g. of ISMP. The application GUI 202 for the installation software application 200 shows a project selection pane where the project 204 to be worked on is selected. As shown in FIG. 2A, the selected product tab 208 invokes the product tree 206. Selecting an element 214 within the product tree 206 (e.g. a bean), causes a property table 216 to be displayed in the adjacent pane where the properties of the element 214 may be easily edited by the developer. In addition, a browser-based information or help window 218 displays information relevant to the currently selected element 214 in the product tree 206. Similarly, as shown in FIG. 2B, the selected install tab 212 invokes the wizard tree 210. Selecting a wizard element 220 within the wizard tree 210, causes one or more property tables 222A, 222B to be displayed in the adjacent pane where the properties of the wizard element 220 may be easily edited by the developer. As before, a browser-based information or help window 218 displays information relevant to the currently selected wizard element 220 in the wizard tree 210. Note that selection of the uninstall tab 224 operates as selection of the install tab 212, but for construction of an uninstall wizard. To package a product, the developer adds predefined (i.e. standard) and custom Java beans to these trees 206, 210 as desired. ISMP provides many predefined beans which may be used. However, a developer may also create new custom beans when necessary.

After all beans are placed in the appropriate trees 206, 210, the application developer builds the project by clicking a button on the toolbar. The end product comprises a Java archive (JAR) file that contains the files to be installed, as well as all beans that will be used to install and uninstall the product. When the JAR file is run using Java technology, a graphical wizard is launched that allows the end user to provide input during the installation. Silent and console installations are also available for when a graphical interface is not desirable. An uninstall JAR file is created during installation that will run another wizard when invoked.

Figure 2C:
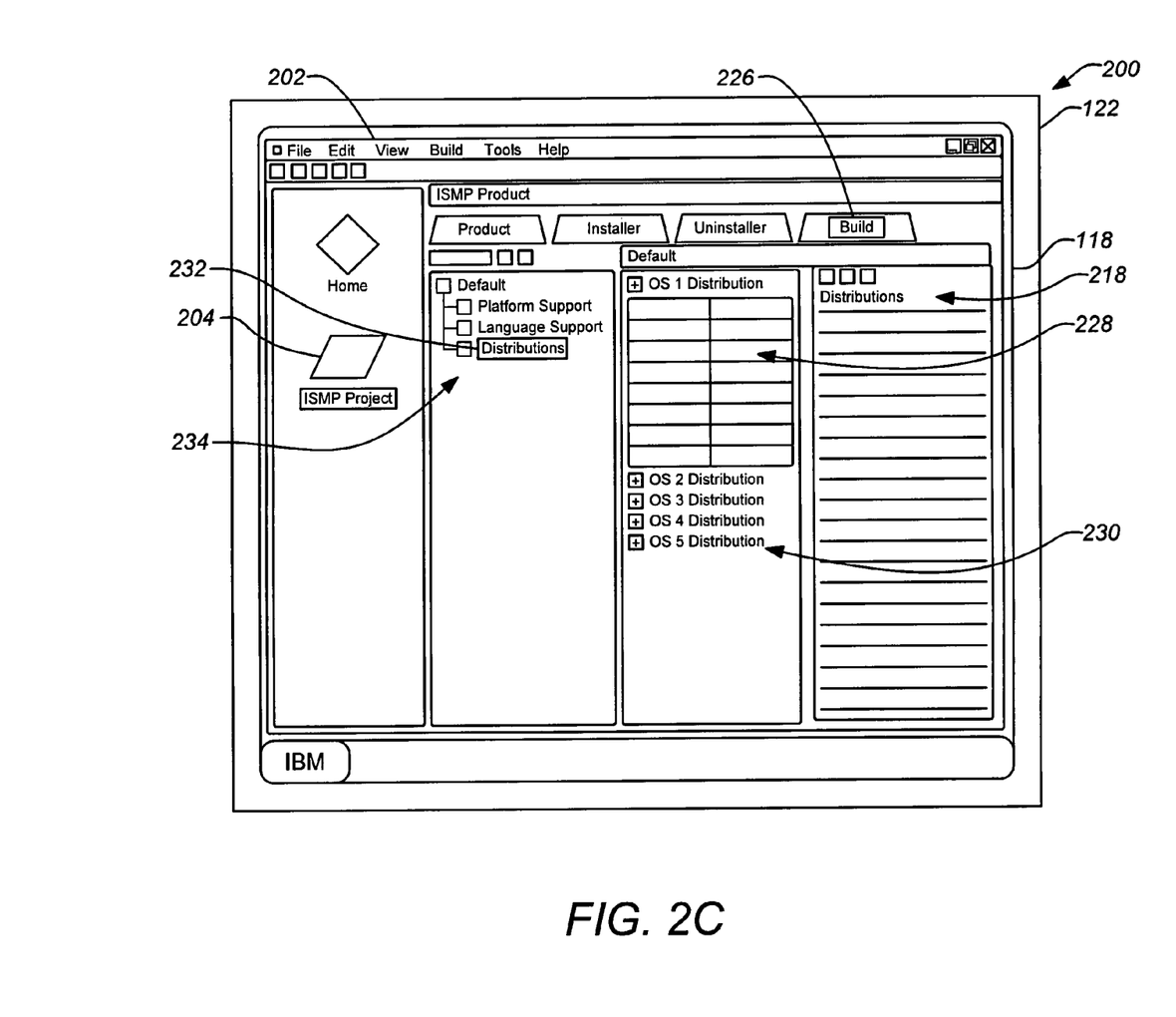
FIG. 2C illustrates an example of launcher distribution properties specified for supported operating systems.

FIG. 2C illustrates an example of launcher distribution properties specified for supported operating systems. Selecting the build tab 226, the application developer can create a native launcher distribution for each supported operating system 230. In use, the launcher distribution will find a version of Java technology on the target system and launch the JAR file with the Java command it finds. It does this by matching Java virtual machine (JVM) search criteria specified by the developer in the distribution properties 228 under "JVM Search Instructions" available for each supported operating system 230 by selecting the distribution 232 under the software build properties tree 234. The native launcher uses hints provided for each operating system 230 to find a Java executable that matches the search criteria, searching in the order specified by the application developer. The developer also can specify a bundled Java virtual machine in the "Bundled JVM" property if a specific Java virtual machine is desired or if an appropriate Java virtual machine is not found on the target system. Launcher distribution properties are specified for supported operating systems. Because the launchers are natively compiled and executed, one must be created for each platform that is supported by the product.

A native uninstaller executable can also be specified by the application developer in the Product tab of the ISMP interface, under Product Tree Properties. If it is specified, a native uninstaller will be created during the installation of the product, along with the uninstall JAR file. Both will be placed in the product install location.

As is known in the art, Java technology allows you to compile bytecode on one platform and run this bytecode on a different platform, thus readily supporting multi-platform development. In addition, the object-oriented and polymorphic nature of Java technology permits flexible solutions that are consistent across all platforms. ISMP uses these aspects of Java technology to provide a familiar look and feel for installations on all the supported platforms. Use of abstraction and inheritance make the implementation more robust, because support for the multiple platforms is handled more consistently.

A set of features that perform installation tasks are important to the operation of ISMP. A pure Java form of these features is provided, and each platform provides any specific implementation that is required by overriding the appropriate methods. For example, in ISMP, the AIX operating system may override the pure Java desktop service methods that handle creating and removing icons to implement these tasks specifically for the Common Desktop Environment (CDE). During execution of the build process as well as installation or uninstallation, the current platform of the target system is determined, and the appropriate service implementations are then used.

Referring back to FIG. 2A, Java beans can ease software development by providing property editors to graphically modify the properties of an installation. The standard (predefined) product and wizard beans provided by ISMP allow the developer to easily add configuration scripts, desktop icons, files, and many other items 236 to the product installation. However, custom beans and property editors are also easy to write. If a custom bean is written, the developer just registers the bean to make it available for placement in one of the trees. Fuctionality of Java applications can be further enhanced by using the Java Native Interface (JNI) to execute native code for tasks not direclty achievable in Java.

Figure 3:
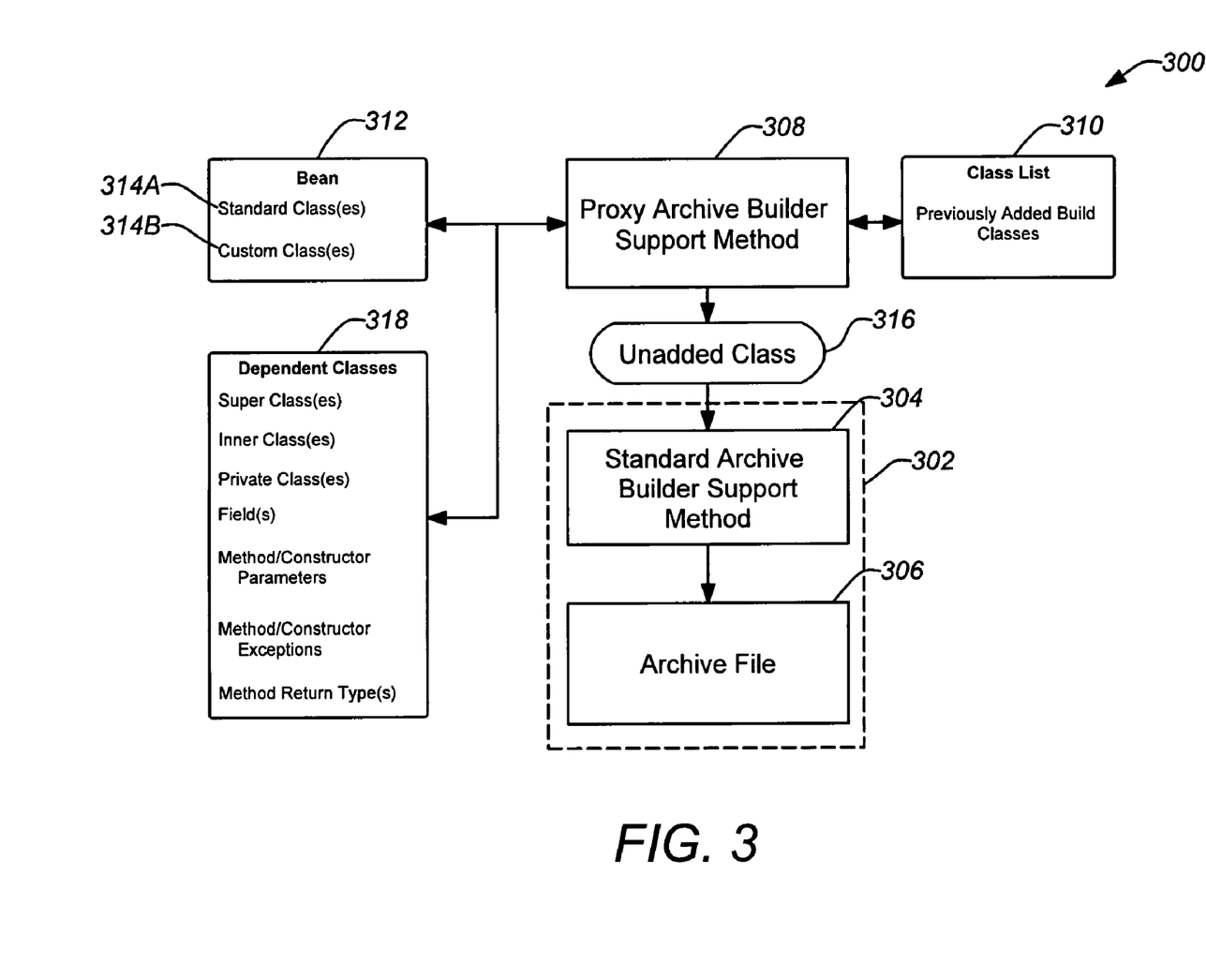
FIG. 3 is a functional block diagram of a exemplary embodiment of the invention.

FIG. 3 is a functional block diagram of a exemplary computer program 300 embodiment of the invention. The computer program 300, may comprise a multiplatform installation software build application, such as ISMP. The computer program 300, generally operates with standard components 302 comprising a standard archive builder support method 304 and an archive file 306 (such as a JAR file). The standard archive builder support method 304 adds classes of beans identified by the developer to the archive file 306 as part of the software build. The classes may be from standard classes (e.g. included with the installation software build application) or custom classes (e.g. written by the developer) as previously discussed.

The novel computer program 300 includes a proxy archive builder support method 308 which keeps a class list 310 of one or more previously added classes that have already been added to the software build. Typically, the one or more previously added classes comprise one or more previously added custom bean classes. The developer identifies a bean 312 to be added to the build which comprises one or more classes (standard classes 314A and/or custom classses 314B) and the proxy archive builder support method 308 checks the class list 310 of the one or more previously added classes for the classes 314A, 314B of the added bean 312. The added bean 312 typically comprises a custom bean and the class comprises a custom class 314B of the custom bean.

Any of the added classes 314A, 314B of the added bean 312 that are not found on the class list 310 are added to the class list 310. Each previously unadded class 316 (one of the classes 314A, 314B of the added bean 312 that are not found on the class list 310) is then passed to the standard archive builder support method 304 to be added to the software build (e.g. the archive file 306) as normal. Because the proxy method 308 tracks the previously added build classes, the standard archive builder support method 304 is selectively invoked to avoid duplicating classes in the build and unnecessary processing. In the example ISMP software, an embodiment of the invention will apply the proxy archive builder support method 308 to the Installshield-provided ISMP beans as well as any custom beans. Thus, all thes beans will be added to the class list 310. However, it is not necessary to apply the proxy archive builder support method 308 to the Java built-in classes.

The proxy method 308 of the computer program 300 may also inspect the previously unadded class 316 of the added bean 312 for one or more dependent classes 318 of the class 316 and add any of the one or more dependent classes 318 found to the class list 310. Just as with any classes of an added bean, the class list 310 is checked for any of the dependent classes 318 as well before they are processed; the proxy method 308 checks the class list 310 for any class it is about to add. Thus, only previously unadded depedendent classes will be added to the build by being passed to the standard archive builder support method 304. Inspecting the class of the added bean for the one or more dependent classes of the class is performed recursively to identify all types of dependent classes, e.g. super classes, inner classes, private classes, fields, method and constructor parameters and exceptions and method return types. In addition, inspecting the class of the added bean for the one or more dependent classes of the class is performed using a standard application program interface (API), such as Java's reflection API along with the java.lang.Class feature. As before, the standard archive builder support method 304 is used to add any of the one or more dependent classes 318 found to the software build (e.g. the archive file 306).

Figure 4:
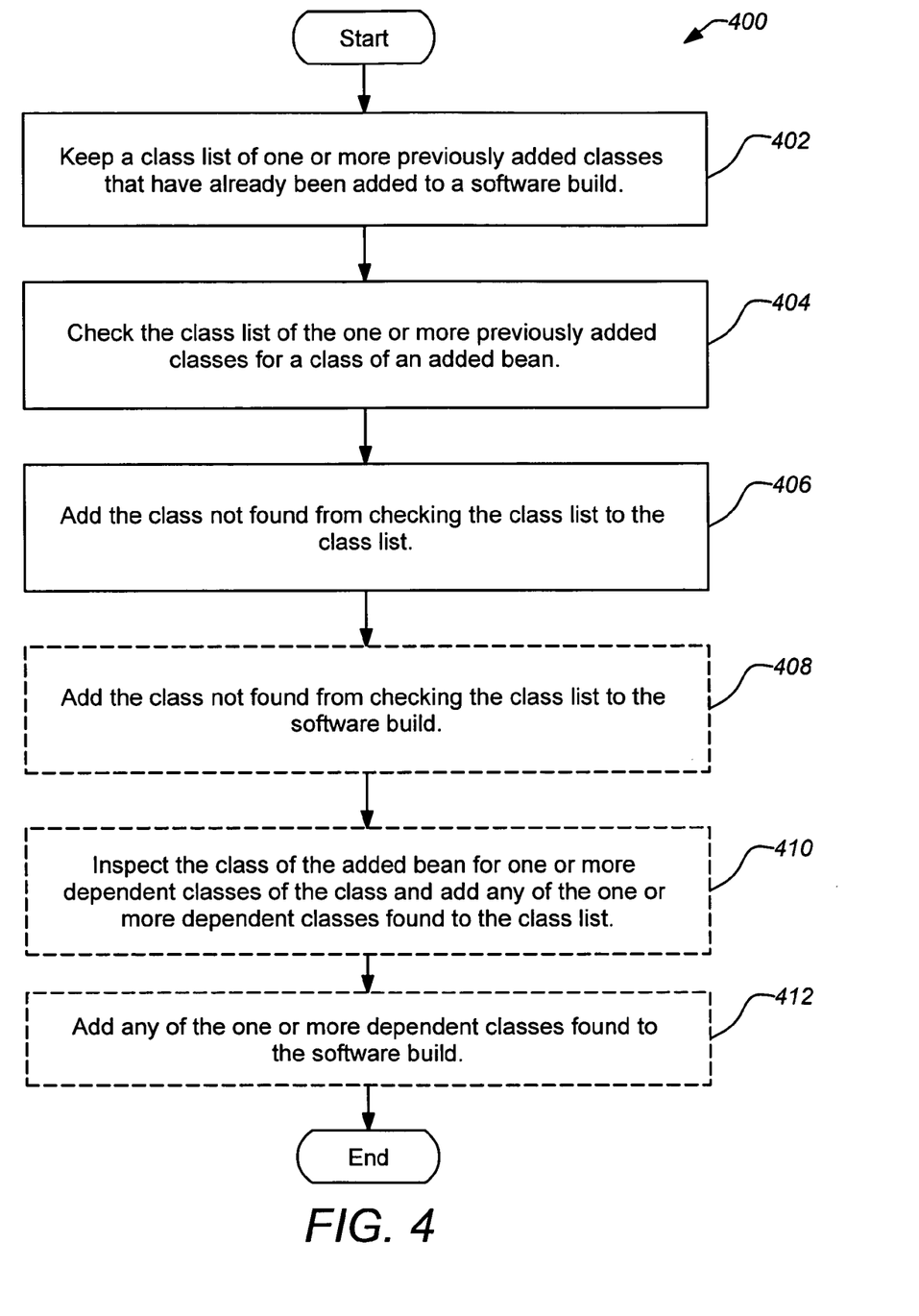
FIG. 4 is a flowchart of a exemplary embodiment of the invention.

FIG. 4 is a flowchart of a exemplary method 400 embodiment of the invention. The method 400 begins with operation 402 keeping a class list of one or more previously added classes that have already been added to a software build. In operation, 404, the class list of the one or more previously added classes is checked for a class of an added bean. In operation 406 the class not found from checking the class list is added to the class list. The method 400 may also include further optional operations (indicated by dotted outlines). For example, in operation 408 the class not found from checking the class list is added to the software build, e.g. to the archive file. In operation 410, the class of the added bean is inspected for one or more dependent classes of the class and any of the one or more dependent classes found are added to the class list. In operation 412, any of the one or more dependent classes found are added to the software build. The method 400 may also be further modified consistent with the computer program embodiments of the invention.

To implement embodiments of the invention, a novel proxy class builder method can be developed. An exemplary implementation is provided here in Java.

```
/**
* (C) Copyright IBM Corp. 2005
*/
package com.ibm.us.alunawat;
import java.util.TreeSet;
import java.lang.reflect.*;
import com.installshield.archive.ArchiveBuilderSupport;
import com.installshield.wizard.UninstallerWizardBuilderSupport;
import com.installshield.util.Log;
/**
* @author: Ajay Lunawat
* Helper build class.
*/
public class builder
{
  private static TreeSet ts = null;
  private static ArchiveBuilderSupport old_support = null;
  /**
   * Add a class and its dependecies to the archive.
   */
  public static void recursePut(ArchiveBuilderSupport support, Class cls)
  {
    if (support instanceof UninstallerWizardBuilderSupport)
    {
      if (support != old_support) // Start of a build!
      {
        ts = new TreeSet( );
        old_support = support;
        process(support, builder.class);
      }
    }
    process(support, cls);
  }
  private static void process(ArchiveBuilderSupport support, Class cls)
  {
        if (cls == null) // Can not do anything when no class!
           return;
        if (cls.isPrimitive( )) //JRE builtin
           return;
        String name = cls.getName( );
        if ( name.startsWith("java.") || name.startsWith("javax.") )
// JRE built in classes
           return;
        if (!ts.add(name)) // Already processed for this run of build.
           return;
        if (!cls.isArray( ))
        {
          try
          {
            support.putClass(cls.getName( ));
          }
          catch (java.io.IOException e)
          {
            support.logEvent(cls, Log.ERROR, e);
            return;
          }
        }
        Class [ ] c = cls.getClasses( );
        for (int i = 0; i < c.length; i++)
           process(support, c[i]);
        c = cls.getDeclaredClasses( );
        for (int i = 0; i < c.length; i++)
           process(support, c[i]);
        c = cls.getInterfaces( );
        for (int i = 0; i < c.length; i++)
           process(support, c[i]);
        Class sc = cls.getSuperclass( );
        process(support, sc);
        sc = cls.getDeclaringClass( );
        process(support, sc);
        sc = cls.getComponentType( );
        process(support, sc);
        Field [ ] fl = cls.getFields( );
        for (int i = 0; i < fl.length; i++)
           process(support, fl[i].getType( ));
```

-continued

```
        fl = cls.getDeclaredFields( );
        for (int i = 0; i < fl.length; i++)
           process(support, fl[i].getType( ));
        Constructor [ ] con = cls.getConstructors( );
        process_cons(support, con);
        con = cls.getDeclaredConstructors( );
        process_cons(support, con);
        Method [ ] mth = cls.getMethods( );
        process_mths(support, mth);
        mth = cls.getDeclaredMethods( );
        process_mths(support, mth);
  }
     private static void process_cons(ArchiveBuilderSupport support,
Constructor [ ] con)
     {
        for (int j = 0; j < con.length; j++)
        {
          Class [ ] c = con[j].getExceptionTypes( );
          for (int i = 0; i < c.length; i++)
             process(support, c[i]);
          c = con[j].getParameterTypes( );
          for (int i = 0; i < c.length; i++)
             process(support, c[i]);
        }
     }
     private static void process_mths(ArchiveBuilderSupport
support, Method [ ] mth)
     {
        for (int j = 0; j < mth.length; j++)
        {
          Class [ ] c = mth[j].getExceptionTypes( );
          for (int i = 0; i < c.length; i++)
             process(support, c[i]);
          c = mth[j].getParameterTypes( );
          for (int i = 0; i < c.length; i++)
             process(support, c[i]);
          Class sc = mth[j].getReturnType( );
          process(support, sc);
        }
     }
}
```

For each custom bean, the proxy archive builder support method is called (e.g. builder.recursePut). The standard archive builder support method (e.g. Archive builder support.putClass) is not called directly for the custom beans.

The process of some example code segments from the builder class for an embodiment of the invention are described hereafter.

```
...
private static TreeSet ts = null;
private static Archive builder support old_support = null;
public static void recursePut(Archive builder support support, Class cls)
   {
     if (support instanceof UninstallerWizardBuilderSupport)
     {
     if (support != old_support) // Start of a build!
     {
        ts = new TreeSet( );
        old_support = support;
        process(support, builder.class);
     }
   }
   process(support, cls);
}
```

The "ts TreeSet" operates as the class list and is used to keep track of which classes have already been processed for the current software build. This gets initialized whenever a new build is started. For example, the ISMP engine may start the build for an uninstall wizard first. For that, it may create a new UninstallerWizardBuilderSupport (a subclass of archive builder support) and use that in calls for build methods. Hence, the detection of a new build needs to happen only when support is an instance of UninstallerWizardBuilderSupport.

The command, "if (support!=old_support)" provides the facility to support multiple restarts of build in the same session of the ISMP installation development environment (IDE).

Furthermore, the condition, "if (!ts.add(name))" provides the ability to detect if a class has already been processed. Accordingly, this restricts the processing of each class to occur only once which improves the build time performance.

The example process method adds the class to the build archive file by calling the standard archive builder support method (e.g. ArchiveBuilderSupport.putClass( . . . )) unless the class is one of the Java built-in classes (a standard class). Once the class is added, the code uses the Java reflection API along with Java.lang.Class feature to inspect the class to find other classes it uses as super class, inner class, private class, field, method/constructor parameters, method return type and exceptions from methods and constructors.

The example code above is not able to handle the classes which are referenced in the code blocks of methods/constructors only. For example, code portions with the following format:

```
public class C
{
   ...
   private void m( )
   {
      ...
      X a = new X( );
      ...
   }
   ...
}
```

The "X" term identifies a class referenced only in method code from class "C" and not anywhere else. The exemplary code of the proxy method, above, will not be able to detect this dependency and will not add "X" to archive. However, to handle such dependencies the code can be designed to parse the class files similar to how the Java decompilers/debuggers as will be understood by those skilled in the art. For example, the source code for the Java debugger (e.g. Java debugger's reference implantation available with java SDK from Sun's Java downloads) can be applied here. Similarly, source code for one of the decompiler implantations, such a Jode or Jreverspro, can be downloaded from sourceforge.net, a open source software development web site, and applied.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a non-transitory computer readable medium, comprising:

A proxy method for tracking one or more previously added build classes in a software build, the proxy method including:

program instructions for keeping a class list of the one or more previously added classes that have already been added to the software build;

program instructions for checking the class list of the one or more previously added classes for a class of an added bean;

program instructions for adding the class of the added bean not found from checking the class list of the one or more previously added classes to the class list of the one or more previously added classes;

program instructions for adding the class of the added bean not found from checking the class list of the one or more previously added classes to the software build;

program instructions for inspecting the class of the added bean for one or more dependent classes of the class of the added bean and adding any of the one or more dependent classes found to the class list of the one or more previously added classes; and program instructions for adding any of the one or more dependent classes found to the software build;

wherein adding the class of the added bean to the software build is performed by passing the class of the added bean not found from checking the class list of the one or more previously added classes to a standard archive builder support method and keeping, checking and adding to the class list of the one or more previously added classes are performed by a proxy archive builder support method; and wherein the proxy method tracks the one or more previously added build classes in the software build such that the standard archive builder support method is selectively invoked to avoid duplicating classes in the software build and unnecessary processing.

2. The computer program of claim 1, wherein inspecting the class of the added bean for the one or more dependent classes of the class is performed recursively.

3. The computer program of claim 1, wherein inspecting the class of the added bean for the one or more dependent classes of the class is performed using a standard application program interface.

4. The computer program of claim 1, wherein the added bean comprises a custom bean and the class comprises a custom class of the custom bean.

5. The computer program of claim 1, wherein the one or more previously added classes comprise one or more previously added custom bean classes.

6. The computer program of claim 1, wherein the software build comprises a multiplatform installation software build.

7. A method, comprising steps performed by one or more processors of:

tracking one or more previously added build classes in a software build with a proxy method performing:

keeping a class list of one or more previously added classes that have already been added to a software build;

checking the class list of the one or more previously added classes for a class of an added bean;

adding the class of the added bean not found from checking the class list of the one or more previously added classes to the class list of the one or more previously added classes;

adding the class of the added bean not found from checking the class list of the one or more previously added classes to the software build;

inspecting the class of the added bean for one or more dependent classes of the class of the added bean and adding any of the one or more dependent classes found to the class list of the one or more previously added classes; and adding any of the one or more dependent classes found to the software build;

wherein adding the class of the added bean to the software build is performed by passing the class of the added bean not found from checking the class list of the one or more previously added classes to a standard archive builder support method, and keeping, checking and adding to the class list of the one or more previously added classes are performed by a proxy archive builder support method; and wherein the proxy method tracks the one or more previously added build classes in the software build such that the standard archive builder support method is selectively invoked to avoid duplicating classes in the software build and unnecessary processing.

8. The method of claim 7, wherein inspecting the class of the added bean for the one or more dependent classes of the class is performed recursively.

9. The method of claim 7, wherein inspecting the class of the added bean for the one or more dependent classes of the class is performed using a standard application program interface.

10. The method of claim 7, wherein the added bean comprises a custom bean and the class comprises a custom class of the custom bean.

11. The method of claim 7, wherein the one or more previously added classes comprise one or more previously added custom bean classes.

12. The method of claim 7, wherein the software build comprises a multiplatform installation software build.

* * * * *